United States Patent
Hansen

(10) Patent No.: US 7,933,680 B2
(45) Date of Patent: Apr. 26, 2011

(54) TANGENTIAL MANUFACTURING SYSTEM

(76) Inventor: Thomas C. Hansen, Rohnert Park, CA (US)

( * ) Notice: Subject to any disclaimer, the term of this patent is extended or adjusted under 35 U.S.C. 154(b) by 451 days.

(21) Appl. No.: 11/917,484

(22) PCT Filed: Jul. 19, 2006

(86) PCT No.: PCT/US2006/028262
§ 371 (c)(1),
(2), (4) Date: Dec. 13, 2007

(87) PCT Pub. No.: WO2007/012056
PCT Pub. Date: Jan. 25, 2007

(65) Prior Publication Data
US 2008/0217308 A1    Sep. 11, 2008

Related U.S. Application Data

(60) Provisional application No. 60/700,965, filed on Jul. 19, 2005.

(51) Int. Cl.
*G06F 19/00* (2006.01)
(52) U.S. Cl. .................... 700/175; 219/121.85
(58) Field of Classification Search .................. 700/175, 700/160, 164, 192; 219/121.85, 121.67; 83/490, 471, 520
See application file for complete search history.

(56) References Cited

U.S. PATENT DOCUMENTS

| | | | | |
|---|---|---|---|---|
| 3,982,162 A * | 9/1976 | Olliffe | ........................... | 388/811 |
| 4,170,726 A * | 10/1979 | Okuda | ..................... | 219/121.69 |
| 4,687,901 A * | 8/1987 | Binder et al. | ............. | 219/121.67 |
| 5,442,565 A * | 8/1995 | Galel | ............................. | 700/160 |
| 6,173,213 B1 * | 1/2001 | Amiguet et al. | .............. | 700/230 |
| 6,195,595 B1 * | 2/2001 | Massee | .......................... | 700/175 |
| 6,384,906 B2 * | 5/2002 | Wardlaw | .......................... | 356/39 |
| 6,910,998 B2 * | 6/2005 | Eberle | .............................. | 494/45 |
| 6,966,874 B2 * | 11/2005 | Cornay et al. | .................. | 494/33 |
| 7,004,898 B2 * | 2/2006 | Hara | ................................ | 494/16 |
| 7,018,326 B2 * | 3/2006 | Koch et al. | ...................... | 494/53 |
| 2004/0245189 A1 * | 12/2004 | Robinson et al. | ............. | 210/787 |
| 2005/0045607 A1 * | 3/2005 | Tenaglia et al. | .......... | 219/121.85 |

* cited by examiner

*Primary Examiner* — Kidest Bahta
(74) *Attorney, Agent, or Firm* — Craig M. Stainbrook; Stainbrook & Stainbrook, LLP

(57) ABSTRACT

Manufacturing system (100) comprises only a few essential components, including: the workpiece(s) (110); the fixtures, or workpiece holding means, (120); the centrifuge (130), including a base (140) and axle (150); the release system (160), preferably a laser source; the containment structure (170); the accretion system, including an accretion substrate (180); and the control system. In operation, the release system directs a focused beam (190) of energy or solid particles to the surface of the workpiece to weaken the bonds of the surface material, and in cooperation with the centrifugal force, induced by the radial motion of the centrifuge, to break the surface material bonds and eject material into a particle path (200) which is directed to the accretion substrate. Thus, in its most essential inventive aspect, the operational and structural scheme of the system entails that the fixtures attach the workpiece to the centrifuge; the release system adds the energy to release material from the workpiece; the containment structure provides a controlled environment and prevents materials and gases from entering into the process area as contaminants or leaving the containment structure as hazards; the accretion controls the accretion process and the accretion substrate; and the control system integrates the actions of the various components of the machine.

9 Claims, 8 Drawing Sheets

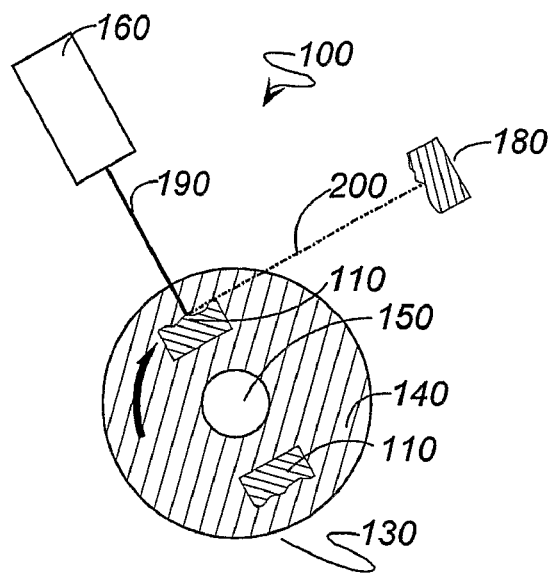
Fig._1
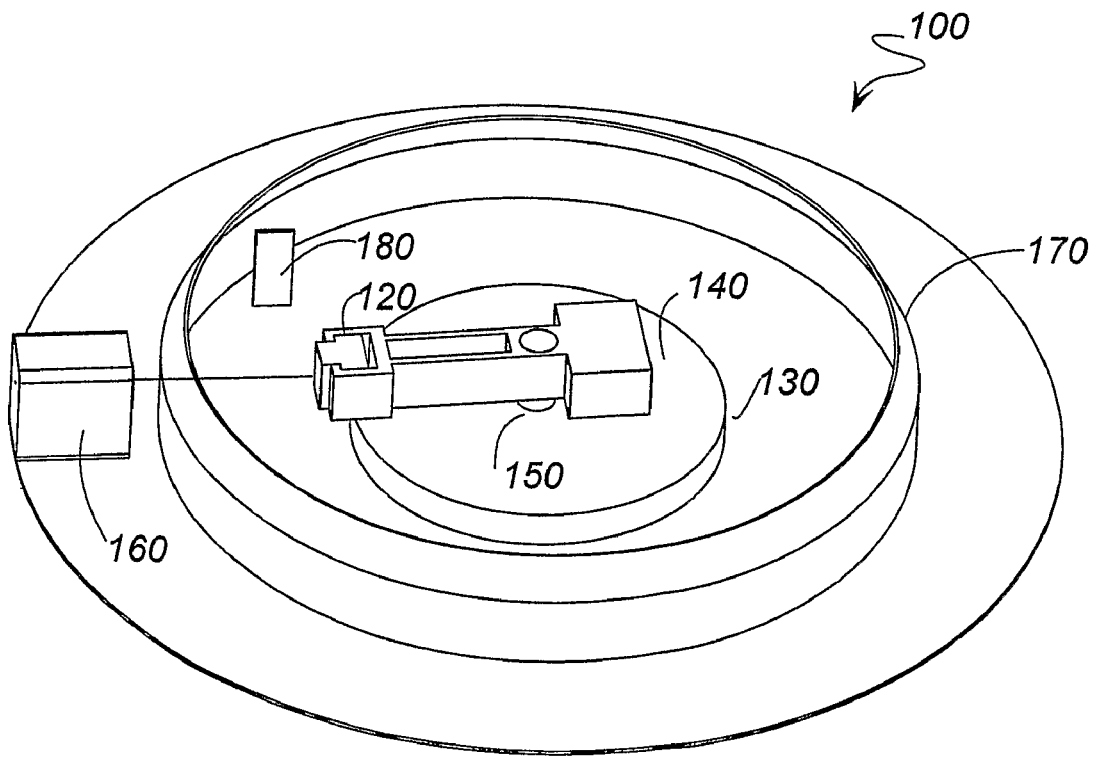
Fig._2

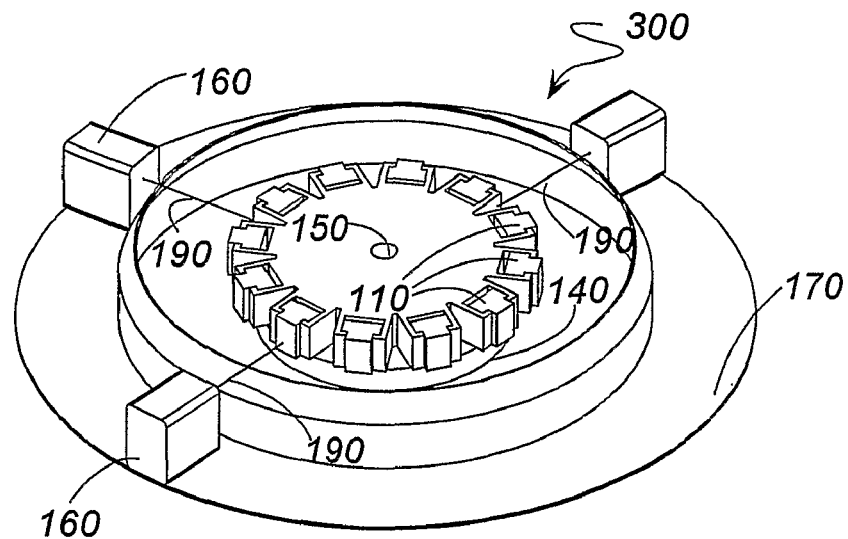
Fig._3
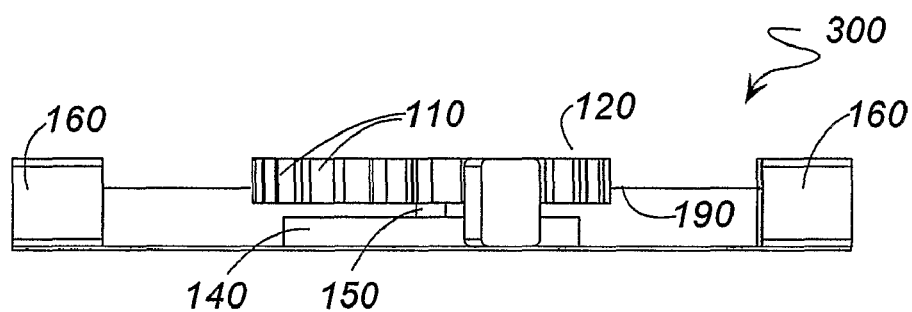
Fig._4
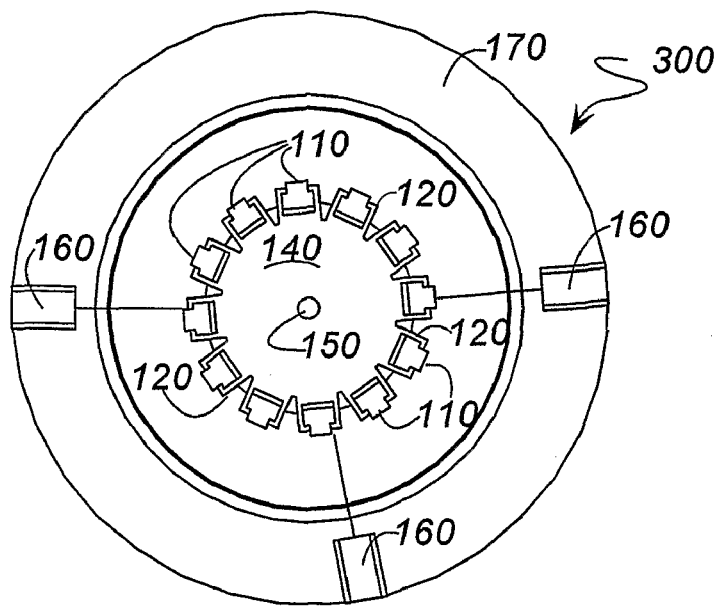
Fig._5

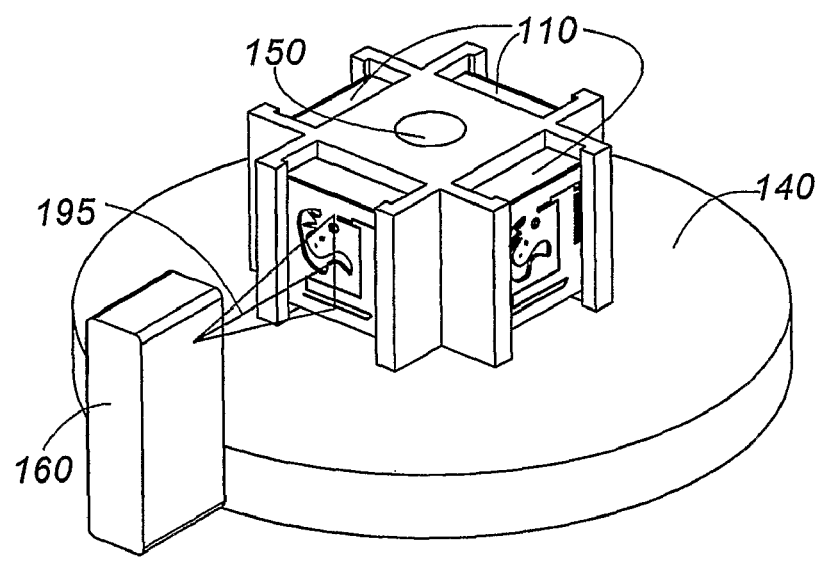
*Fig._6*
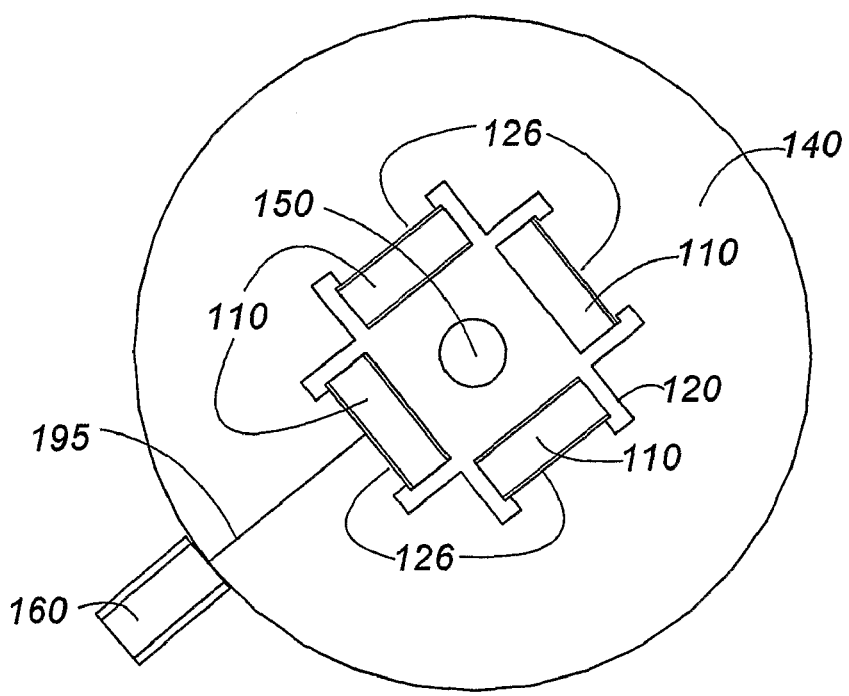
*Fig._7*

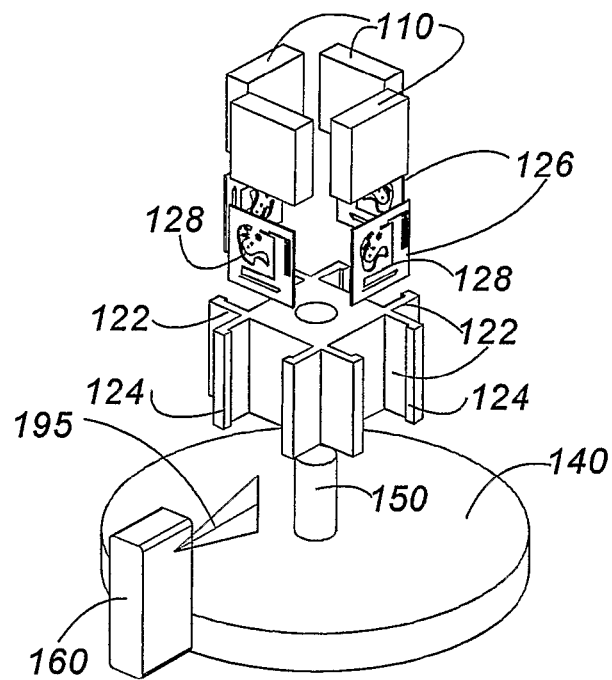
Fig._8
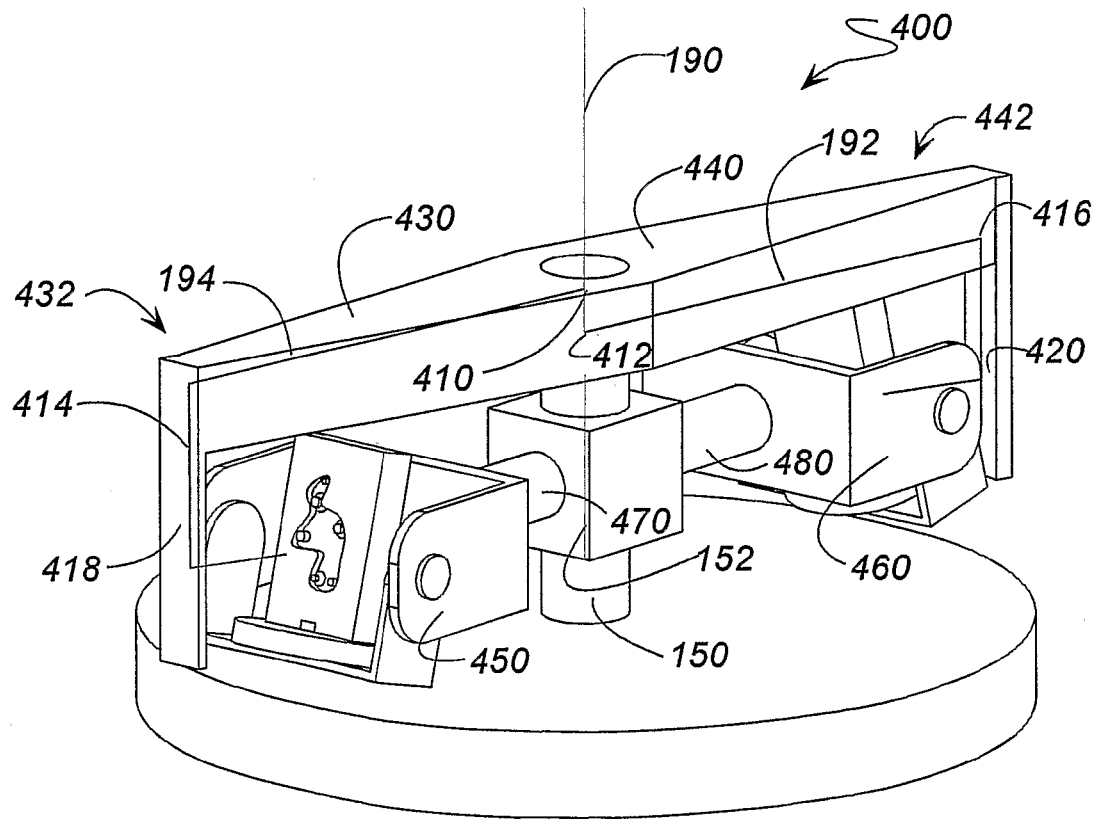
Fig._9

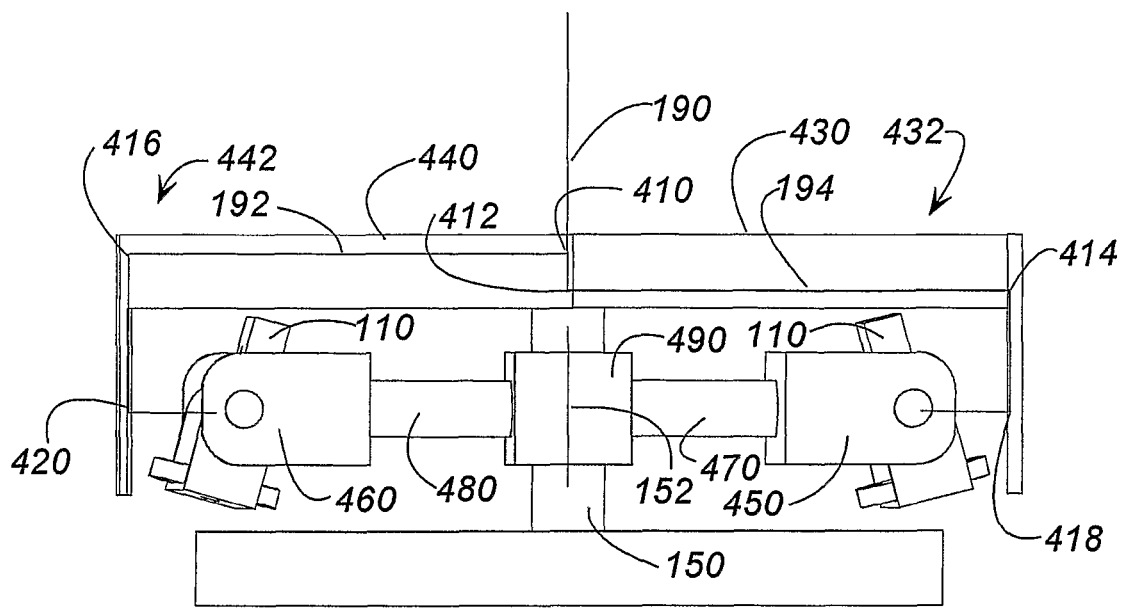
Fig._10
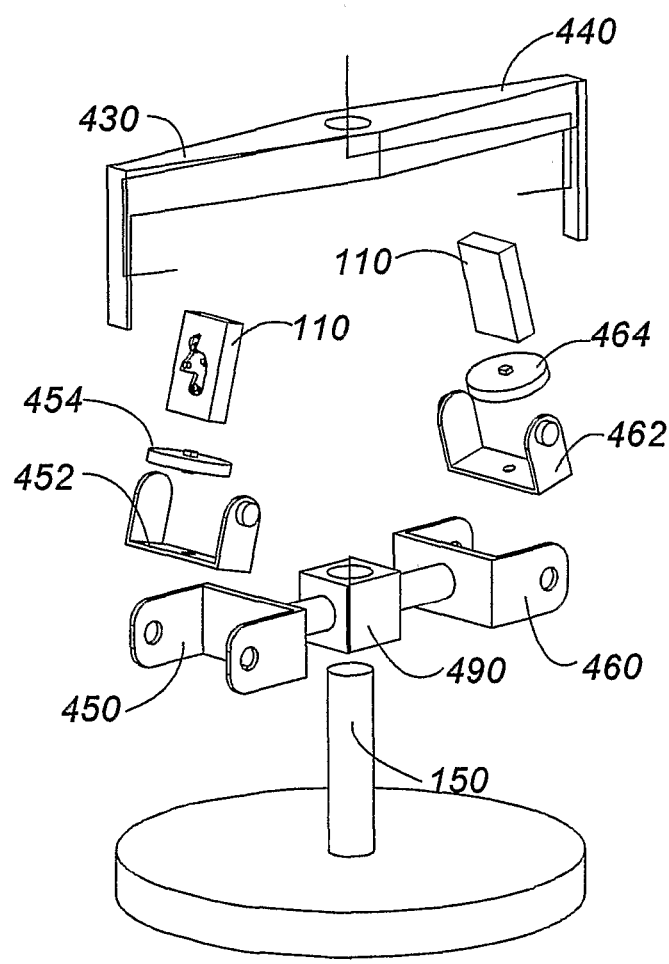
Fig._11

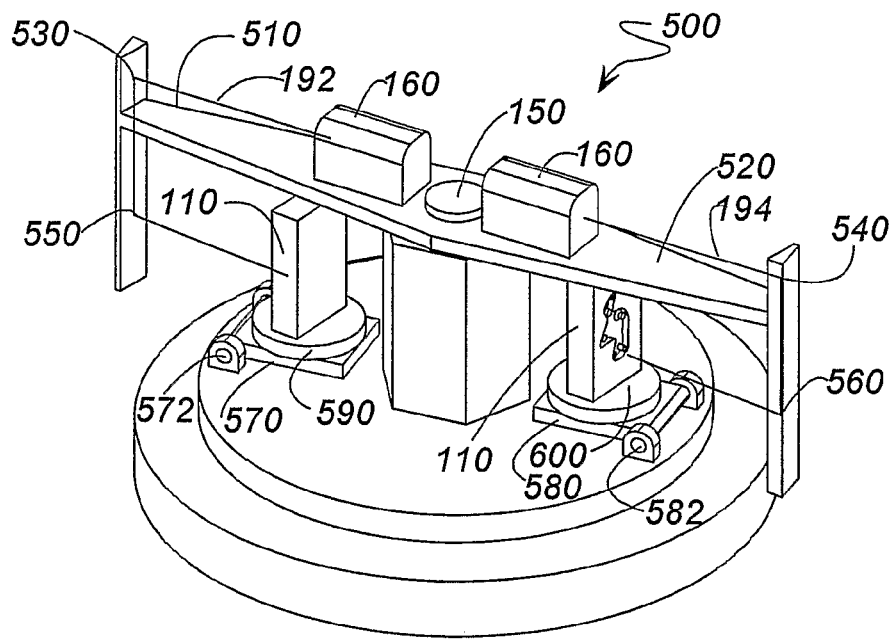
*Fig._12*
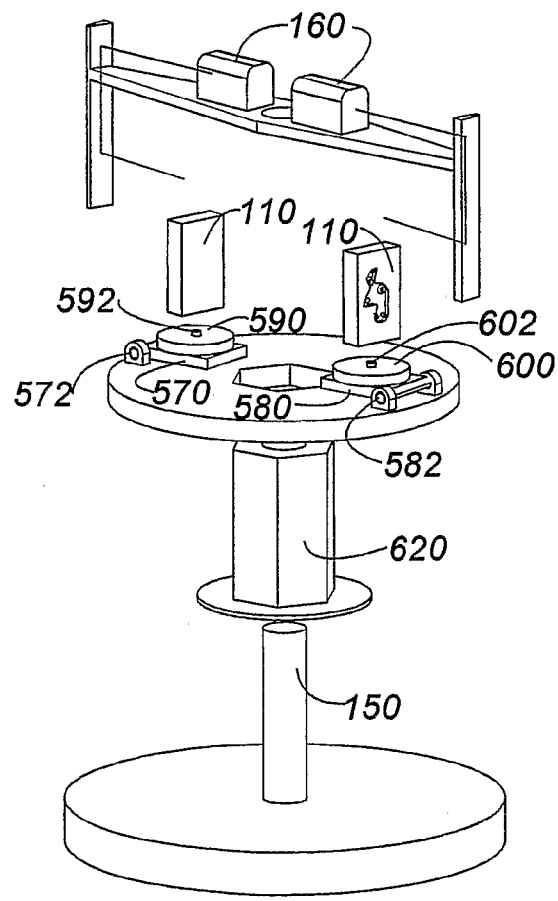
*Fig._13*

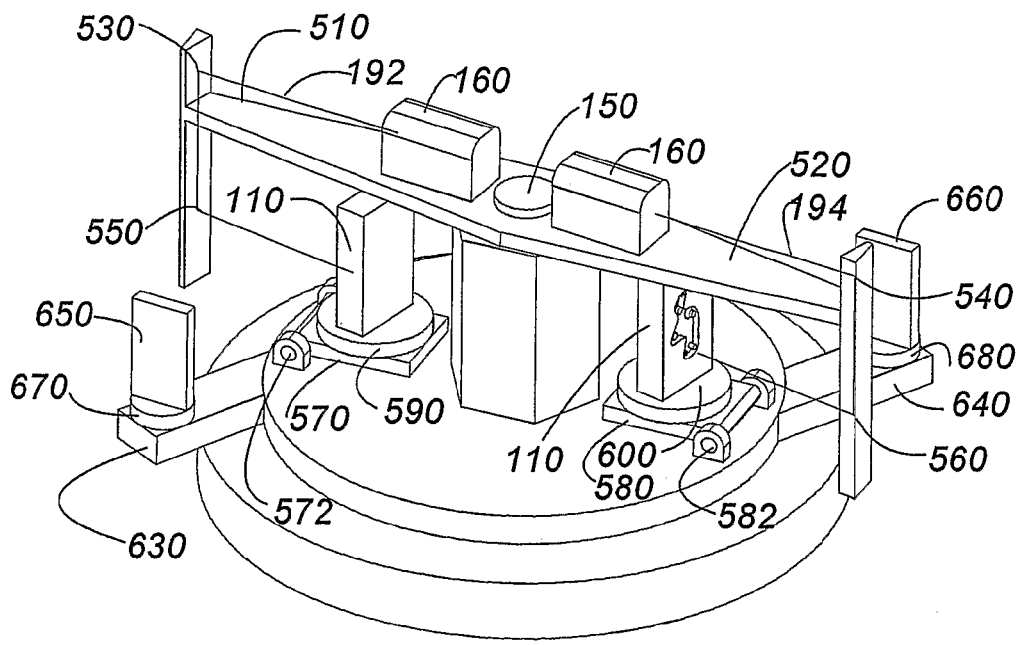
Fig._14
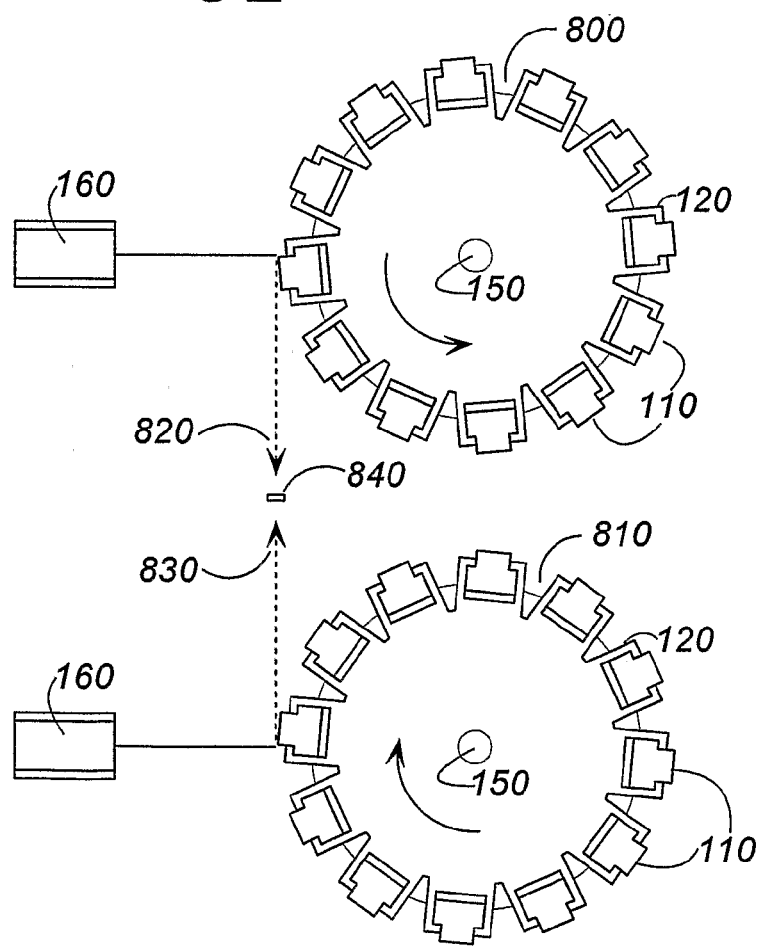
Fig._15

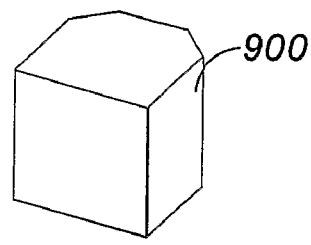
Fig._16
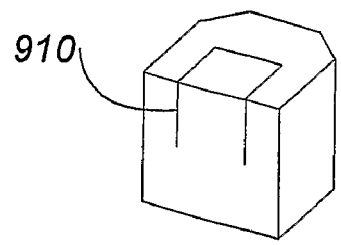
Fig._16a
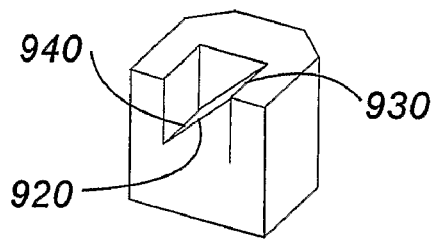
Fig._16b
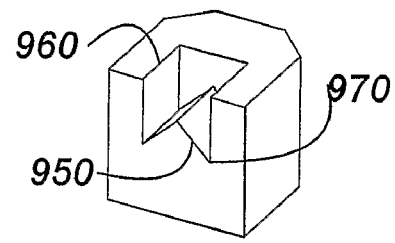
Fig._16c
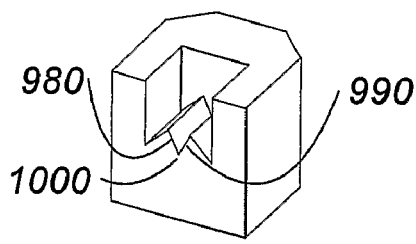
Fig._16d
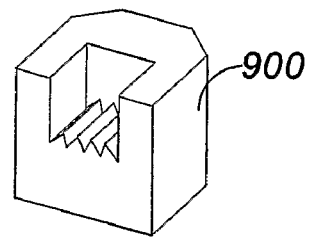
Fig._16e
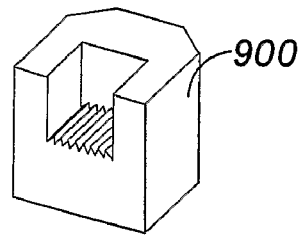
Fig._16f

TANGENTIAL MANUFACTURING SYSTEM

BACKGROUND OF THE INVENTION

1. Technical Field

The present invention relates generally to machining methods and apparatus, and more particularly to machining methods and apparatus that employ lasers in the cutting, shaping, and finishing of solid materials, and still more particularly to a method and apparatus for high power processing of a solid workpiece rotated on a centrifuge that facilitates the simultaneous shaping of the workpiece through the selective removal of material and the accretion/formation of a second article of manufacture from the material tangentially ejected from the workpiece.

2. Background Art

The use of lasers in machining practices is well known. Additionally, shaping, cutting, and finishing a workpiece by rotating the workpiece rapidly while applying a tool to the workpiece is well known. The common lathe is an example of apparatus that works in this fashion. Variations on the lathe that employ high powered pulsed radiation as a cutting or shaping force are also known. Several contemporary patents show the several uses made of lasers that rotate relative to a workpiece, or visa versa, including U.S. Pat. No. 4,170,726, to Okuda, which teaches a method of shaping and smoothing workpiece by applying a laser beam to a rotating workpiece tangential to the path of rotation with a suitable tolerance while the light is shifted relative to the workpiece. The irradiated portion of the workpiece is melted and the molten material is removed by gas air or jet. A tool is employed to work the grooved surface after it has been heated by the laser and the debris is removed.

U.S. Pat. No. 4,687,901, to Binder, et al., discloses a laser cutting and welding machine having two $CO_2$ lasers producing laser beams and a guiding and reorienting system for directing the laser beam to a workpiece. The workpiece is fixed and the lasers rotate about the workpiece. No debris removal means are discussed or disclosed.

U.S. Pat. No. 5,442,565, to Galel, teaches a cutting apparatus that employs real time in-process data collection to determine the contour and position of the interface between dissimilar layers of material. A control system is automatically programmed, based on the determined contour and position of the interface, to employ a linear motion device to autonomously control the motion of a cutter through a conventional motion control system.

U.S. Pat. No. 6,173,213, to Amiguet et al., shows a wheel style recognition system for identifying and orienting wheel workpieces. It uses lasers to locate identification and starting point marks on a wheel. The systems include a wheel style recognition station, a conveyor for delivering a wheel workpiece to the wheel style recognition station, and a wheel orientation sensor that senses the radial orientation of the wheel workpiece on the wheel style recognition station, and generates a radial orientation signal. A wheel mapping sensor scans the wheel workpiece and generates a wheel style mapping signal pattern, while the wheel workpiece is rotated at a steady rate of rotation. A control unit compares the wheel style mapping signal pattern with at least one reference wheel style mapping signal pattern.

U.S. Pat. No. 6,195,595, to Massee, shows an apparatus for working a workpiece which includes drive means for rotating a carrier about an axis of rotation and a tool for working the workpiece. The apparatus further includes tool moving means for moving the tool in an x-direction and a y-direction with respect to the drive means, and a control unit comprising a memory for one or more control programs for controlling the moving means in accordance with a control program, in such a manner that the tool will follow one or more desired paths for working the workpiece. Laser beams are employed to scan and measure the workpiece. If a difference is detected between a stored apparatus parameter and the measured ones, then each control program is adapted so that the tool will still follow the desired paths.

U.S. Pat. Appl. Pub. No. 20050045607, by Tenaglia, et al., shows a method and apparatus for improving properties of a solid material by applying shockwaves to the material. Laser shock processing is used to provide the shockwaves. The method includes applying a liquid energy-absorbing overlay, which is resistant to erosion and dissolution by a transparent water overlay and which is resistant to drying to a portion of the surface of the solid material and then applying a transparent overlay to the coated portion of the solid material. A pulse of coherent laser energy is directed to the coated portion of the solid material to create a shockwave. At least a portion of the unspent energy-absorbing overlay can be reused in situ at a further laser treatment location and/or recovered for later use.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein. Specifically, none of the known prior art and/or prior art references show a method of shaping, cutting, and finishing solid material by the process described in the following summary and detailed description of the instant invention.

DISCLOSURE OF INVENTION

This inventive system provides apparatus to spin a workpiece at high speeds (e.g., 10,000 to 45,000 rpm, or higher), apply a force to the workpiece to release some portion of the solid material, thereby ejecting the released material on a tangential path relative to the rotating workpiece, and, if desired, directing the ejected material to a specified structure on which a second article of manufacture is formed through a material accretion process.

The inventive system provides a number of advantageous and novel features, including: high speed machining; ease of forming many types of materials, the possible use of light weight machines, high precision and accuracy, and the elimination of the need for tools. The following description of the inventive tangential manufacturing system first describes the system processes and then describes the components that perform the processes.

Releasing Process: Overview

Centripetal force is the force that keeps the workpiece in its rotating path. When the centripetal force exceeds the bond strength attaching a particle of material to the surface of the workpiece, the particle of material "breaks" free and the particle will follow its inertial path at a tangent to the rotation. To release a particle of the material, the combination of centripetal force and the energy added by the release agent must be greater than the bond strength holding the material to the workpiece. It therefore follows that the greater the rotation rate and the closer to the axis the work surface is, i.e. the greater the centripetal force, the less energy required by the releasing agent to remove material from the surface. Newton's law describes how the centripetal force varies inversely with the radius and by the square of the rotation rate.

Primary Releasing Processes: Physical, Chemical and Thermal.

Physical: There are three main releasing processes. The physical process has a jet of material directed to the workpiece as it passes. In this case the material in the jet strikes the surface and breaks off some of the surface. The jet material can be a gas or liquid and it can include solid material in the jet. Examples include frozen gas, such as dry ice, or mineral as in sandblasting, or metal as in shot blasting, or plastic as in bead blasting. These would all be carried in a gas stream through the jet. Liquid jetting (often called a waterjet) material could also have additives. Typically these additives increase the surface tension so that the stream holds together as it passes from the jet orifice to the target material.

Chemical: The second releasing agent is chemical. A caustic chemical is applied onto the work surface and the chemical reaction with the workpiece material surface breaks the bonds holding the material. There are four typical chemical techniques. The first is a dissolving jet sprayed on the workpiece. Water and oil based solvents are typical of this type of solution. Other chemicals include acidic solutions, alkaline solutions or enzyme solutions. Each of these chemical agents would be sprayed via a pressurized jet. This spraying also can be done using "ink-jet" technology and the drop size can be quite small.

Thermal: The last releasing agent process is thermal. When a portion of the solid workpiece material is heated, it changes state into a liquid or into a gas. A pressurized jet of hot material or an energy beam such as a laser or electron beam can add this thermal energy. An interesting aspect is material having a higher thermal state, e.g. liquid or gas, is projected from the surface and leaves behind a cooler solid material.

Another way to add heat to the workpiece is by burning, which is a cross between the chemical process and the thermal process. Adding an ignition (thermal energy) source in conjunction with an appropriate atmosphere allows the workpiece material to ignite and burn in an exothermic chemical reaction. This burning process then provides the heat as well as the initial ignition source to release a portion of the workpiece.

Projection and Ejection: There are four main techniques to project and eject the released material from the workpiece: The tangential process, electrical charge, gas expansion, and a pressurized jet.

Tangential Process: The main technique in this process is to use the ever changing tangents of the workpiece rotational motion. The tangential motion velocity is dependent upon the rotation rate at the radius from which the surface material is being projected. When the radius of the material being ejected is less than about 40% of the total radius of the workpiece on the centrifuge, the tangential velocity is insufficient for the material to clear the sides of an extremely narrow bore. This limitation can be avoided by having the fixtures holding the workpiece mount at greater than 40% of the total radius. Note: The term "projected" is used because the process is by the elimination of centripetal force instead of an application of a force.

Electric Charge: To add to this projection, the workpiece can be charged with a voltage. When a small portion of the workpiece is released, the small piece of material will have the same charge as the workpiece. Since like charges repel each other, the released material will be ejected away from the workpiece surface.

Gas Expansion: Another method by which the debris is ejected is from the thermal expansion of gases. As the workpiece is heated, the gas adjacent to, and or internal to the material expands. The gas that is behind and between the debris material and the workpiece applies pressure to the debris material, which ejects it from the workpiece.

Pressurized Jet: A gas or liquid jet can be directed at the workpiece surface to assist in the debris removal.

The amount of material removed from the workpiece can be determined in a number of ways. One method is to use a strain gauge as a force sensor on the attachment of the fixture to the centrifuge. The centripetal force varies directly with the mass at a fixed radius and a constant rotation rate. By measuring the reduction in force and by measuring the reduction in radius via laser triangulation or laser interferometers the change in mass can be determined.

The Accretion Process: When particles of material are projected and ejected from the workpiece, they fly in a path generally tangential to the rotational path of the workpiece. A substrate can be placed in the path so that the projected particles are transferred to it. As multiple particles are transferred to the substrate, their impact position and location can be controlled so that they combine to form a desired shape.

There are a number of ways to control the particle trajectory. One method is to adjust the starting point of the tangential path so that the particles will land in a specified area. For finer control, the particles can be charged in the workpiece. These charged particles may be passed through one or more magnetic yokes to alter and adjust the particle trajectory, much as charged particle trajectories are adjusted in a cathode ray tube by varying the current in the coil yokes. In another method, the charged particle could fly past electrically charged plates that alter the trajectory. The magnetic yokes and or charged plates would be finely controlled to affect the particle path.

A gas or liquid jet could also be used to adjust the trajectory of the particles by blowing the particles.

Although the released particles are typically quite small, in a terrestrial environment they remain under the influence of gravity. Particle trajectories in a gravitational field, such as here on Earth, must be adjusted, taking gravity into account as part of the control process. Further, the rotation of the centrifuge with charged workpieces creates a virtual current, i.e. moving charges. The moving charges create a magnetic field. The induced magnetic field has its poles on the centrifuge axis. This magnetic field must also to be taken into account in calculating and controlling particle trajectory.

The substrate upon which the particles land can be fabricated from a number of suitable materials. The substrates can be solid material or semi-solid material, such as a gel. The substrate material need not be held in a fixed orientation. It can be attached to a fixture, which may be rotated on one or more axes, and/or translated in one or more directions. Three-dimensional structures can be constructed using this process.

Different types of projected material can be used in the accretion process. Using different materials on the centrifuge, a composite can be accreted of metal, plastic, glass, or minerals.

To enhance this process, the environment immediately around the substrate can be controlled to make it suitable for the accretion process. The substrate can be charged in the opposite of the charged particles so that the substrate is attractive to the particles. Portions of the substrate can be masked so that the particles are attracted to specific areas of the substrate. In addition, the environment might have gases added to enhance the adhesion, and the substrate can have other materials being concurrently deposited from other sources. The substrate chamber may include temperature control for either a constant temperature or a varying temperature at different times in the manufacturing process. Also, the mechanical environment of the substrate need not be empty. It may have various kinds of external supports and may be filled with a gel or foam.

The process of removing material from one workpiece and adding it to another developing article of manufacture can be quite useful in the manufacture of molds, such as for injection molding.

Process Environmental Control: It is preferable that a chamber be constructed in which the workpiece rotates. The releasing agent system may be exterior to this chamber, but it has access to it. The environment of the chamber is preferably controlled. The aspects that can be controlled include, but are not limited to, the selective presence of gases; the magnetic field, electrical charges, and temperature.

Chamber Gases: The chamber may have interior air moved by the centrifuge and workpieces, or it can be under the control of directional blowers. The blowers can be variable in velocity and direction. The gaseous environment can have specific gases inside the environment such as oxygen for enhanced burning. Inert gases such as argon or helium can be introduced to retard oxidation, or reactive gases may be introduced into the environment. A partial or full vacuum can also be pulled on the chamber.

Chamber Magnetic Fields and Electrical Properties: The chamber may have a magnetic environment which may be controlled with coils or other means. The chamber can also have an electrical environment controlled with charged plates and wires.

Chamber Temperature: The temperature inside the chamber may be held constant or it can be variable. The variation may be uniform within the chamber or there may be variations introduced in different zones in the chamber.

At relatively slow rotation speeds, processes other than material removal can be used to treat the workpiece. For example, before the workpiece undergoes a material removal process, it can be washed or sprayed clean. After material removal, the workpiece can be heat treated such as annealing or tempering. For heat treating, different sources for the heat can be used, including lasers, electron beams or convection heating. The centrifuge can also contain heating elements to heat the workpieces. The workpiece can be sprayed with a coating, such as a chemical or powder coating or a wet paint coating. Ink-jet style coatings can also be applied to the rotating workpiece. The temperature control of the chamber could then be used to dry or bake the material applied to the surface.

System Advantages: The present invention has a number of advantages. A notable feature is the lack of tools required for use. In traditional machining, tools are typically fabricated from a hardened material shaped into an edge or point and applied to the surface of the workpiece to chip, score, gouge or otherwise cut away a portion of the surface. The shape cut in the surface is dependent in part, by the shape and hardness of the tool. Further, each type of material being worked requires different tool shapes to effectively remove the surface. Accordingly, in typical machining, regular tool changes are required to achieve the shape desired. Every tool change takes time.

In the present inventive system, in place of a hardened tool or tools, an energy beam or jet is employed to release the material from the workpiece surface. This beam/jet shape is adjusted (essentially instantaneously) as part of the control system; therefore no tool changes are required. This saves time and the expense of the tools as well as storage and inventory of the tools. Further, this system also has the ability to shape numerous types of materials, from metals and minerals, to glass, plastics, and composites.

In traditional machining heat is generated as a tool cuts material from the workpiece surface. The heat causes thermal expansion and some distortion of the workpiece. To remove the heat, cooling fluids or gases are jetted onto the workpiece from an exterior source and/or from passageways internal to the cutting tool. An additional method is to use the tailings or chips removed as heat carriers. However, this requires careful control of the cutting tool shape as well as the high speed cutting process.

The inventive tangential manufacturing system process releases the hottest material and projects it from the surface so that the workpiece remains cool. The heat affected areas are also reduced in this system since the released material does not stay in contact with the workpiece.

Furthermore, in traditional machining the cutting tool causes vibrations in the workpiece during the machining process. Such vibrations change the positional relationship of the tool to the workpiece, and these changes can cause errors in the machining process unless compensations and/or adjustments are made. Most commonly, to reduce vibrations the machines are extremely massive structures to rigidly fix the relationship of the tool to the workpiece.

In using the inventive system, when material is removed tangentially from the surface of a workpiece as the workpiece rotates, there is a reaction force directed towards the axis of the centrifuge. This force is directly related to the amount of mass reduction, the square of the rotation rate, and inverse of the radius of the material being removed. In addition to this radial force, there is the reduction in mass. Both of these effects could cause vibration and an unbalancing of the centrifuge. Accordingly, workpieces may be positioned on opposite sides of the centrifuge and worked on concurrently, thus cancelling the forces for a zero net effect. In this manner, vibrations can be kept to a minimum. Other methods of maintaining centrifuge balance can also be employed.

There is a special situation where the features of this system uniquely match the manufacturing requirements; viz., zero gravity space-based manufacturing. Lifting materials into space is quite expensive. It is cost prohibitive to put a complete machine shop with all of its tools and massive machines into space. Using the inventive system, a single machine could make virtually any parts required in space, given access to the materials and a computer description of the part. For space stations or for extended voyage spaceships this can be extremely useful, especially in the repair or replacement of damaged parts.

It is therefore an object of the present invention to provide a new and improved tangential manufacturing system that spins a solid workpiece at high speeds, applies a force to the workpiece, thereby releasing and ejecting a portion of the workpiece material in molten or semi-molten form on a path tangential to the rotating workpiece.

It is another object of the present invention to provide a new and improved tangential manufacturing system that directs material ejected from a spinning workpiece to a substrate to form a newly manufactured object using a material accretion or deposition process.

A further object or feature of the present invention is a new and improved tangential manufacturing system that provides a material cutting and removal process that is more efficient than conventional machining processes.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is schematic top plan view of showing the essential functional principles of the inventive tangential manufacturing system;

FIG. 2 is a perspective view of a first preferred embodiment of the tangential manufacturing system of the present invention;

FIG. 3 is a perspective view showing elements of a second preferred embodiment of the inventive system;

FIG. 4 is a side view in elevation thereof;

FIG. 5 is a top plan view thereof;

FIG. 6 is a perspective view showing elements of a third preferred embodiment of the inventive tangential manufacturing system, including elements for shaping a substrate with a masking process;

FIG. 7 is a top plan view thereof;

FIG. 8 is an exploded perspective view thereof;

FIG. 9 is a perspective view showing elements of a fourth preferred embodiment of the inventive system;

FIG. 10 is a side view in elevation thereof;

FIG. 11 is an exploded perspective view thereof;

FIG. 12 is a perspective view showing elements of a fifth preferred embodiment of the inventive system;

FIG. 13 is a side view in elevation thereof;

FIG. 14 is a perspective view showing a sixth preferred embodiment;

FIG. 15 is a schematic top plan view showing side-by-side centrifuges rotating in opposing directions to eject material onto opposing sides of an accretion substrate positioned between the centrifuges;

FIGS. 16, and 16a-16f are perspective views showing a cuboid workpiece undergoing a sectioning process using the inventive method and apparatus.

BEST MODE FOR CARRYING OUT THE INVENTION

Referring to FIGS. 1 through 14f, wherein like reference numerals refer to like components in the various views, there is illustrated therein a new and improved tangential manufacturing system, generally denominated 100 herein.

Referring now to FIGS. 1 and 2, it will be seen that the inventive tangential manufacturing system 100 comprises only a few essential components, including: workpiece(s) 110; fixtures, or workpiece holding means, 120; a rotation device, such as a centrifuge 130, including a base 140 and axle 150; a release system 160, preferably a laser source; a containment structure 170; a control system (not shown, but well known in the art), and a motor for mechanically driving the centrifuge (also not shown, but well known in the art). As used herein, "centrifuge" is used broadly to mean a rotating machine which subjects material rotated about the axis of rotation of its axle to a strong centrifugal force. The essential system may also include a material accretion system, including an accretion substrate 180.

In operation, the release system directs a focused beam 190 of energy or solid particles to the surface of the workpiece to weaken the bonds of the surface material, and in cooperation with the centrifugal force, induced by the radial motion of the centrifuge, to break the surface material bonds and eject material into a particle path 200 directed to the accretion substrate.

Thus, in its most essential inventive aspect, the operational and structural scheme of the system entails that the fixtures attach the workpiece to the centrifuge; the release system adds the energy to release material from the workpiece; the containment structure provides a controlled environment and prevents materials and gases from entering into the process area as contaminants or leaving the containment structure as hazards; the accretion system controls the accretion process and the accretion substrate; and the control system integrates the actions of the various components of the machine.

In a first preferred embodiment of the inventive system, FIG. 2, the tangential manufacturing system comprises a single release means located exteriorly to the centrifuge and containment structure, for directing a high powered beam of energy or material. FIGS. 3-5 show a second preferred embodiment 200, in which three energy sources are located exterior to the containment system, each directing a focused beam of coherent energy in a controlled fashion to a plurality of workpieces as they rotate into the path of the beam.

FIGS. 6-8 show a third preferred embodiment of the inventive system, having a circumferentially disposed single laser source 160 directing a plurality of beams or a more diffuse beam region 195 to a plurality of substantially cuboid workpieces 110, each secured in workpiece fixtures 120 which comprise arms 122 and fingers 124 normal to the arms so as to provide means for capturing and retaining the workpieces. Masks 126 having a stenciled design 128 are disposed in interpositional relationship between the laser source and the surface of the workpiece. In this configuration, when the masked workpiece passes the energy source, which effectively covers the entire surface area of the workpiece, the energy passes only through the stencil portion and the balance of the energy is either reflected or absorbed by the mask material. With each cycle of the centrifuge, the energy source covering the workpiece surface removes a layer of surface material. The amount of the workpiece material removed will depend on the exposure duration determined by the rotational speed multiplied by the number of passes. Adjusting the mask or using different masks allows the workpiece to have multiple layers removed at different depths.

FIGS. 9-11 show a fourth preferred embodiment 400 of the inventive system, comprising a single laser source 160 disposed immediately and directly above the axle 150 of the centrifuge. The initial beam 190 is directed through an opening in the axle and then split into divergent beams 192, 194, by proximal mirrors 410, 412 disposed axially within the axle 150. The split beams are directed radially through opposing optical guide arms 430, 440, to a set of upper distal mirrors 414, 416, disposed at the distal portion 432, 442 of the optical guide arms, at which point they are directed downwardly to a set of lower distal mirrors 418, 420, which again reflect the beams, but this time inwardly toward the axis of rotation 152 of the axle 150. The structures holding mirrors 410, 430 are typically hollow to allow passage of the focused beam.

The workpieces 110 are pivotally affixed to angle mounts 450, 460, which are disposed on the outer portion of turntable arms 470, 480 extending radially from a hub 490. The angle mounts can include a second axis point 452, 462, on which are mounted pivotal platforms 454, 464, which swivel in a predetermined range to allow the surface of the workpiece to pivot relative to the beam.

FIGS. 12 and 13 show a fifth preferred embodiment 500 of the inventive system, which includes two laser sources disposed atop optical guide arms 510, 520. The lasers direct two distinct beams 192, 194 outwardly to a set of upper distal mirrors 530, 540, which reflect the beams downwardly to a set of lower distal mirrors 550, 560, which again reflect the beams inwardly toward the axis of rotation of the axle 150. Angle mounts 570, 580 are pivotally affixed on an x-axis 572, 582, and y-axis platforms 590, 600, are pivotally affixed to the angle mounts at a y-axis 592, 602. The entire workpiece mounting system is deployed on a selectively removable cassette 610 which can be axially disposed over a fixed or rotatable hub 620.

FIG. 14 shows a variation on the fifth preferred embodiment which can include one or more arms 630, 640, affixed to and cantilevered from the base 140. Each arm supports an accretion substrate 650, 660, each substrate having a base 670, 680 pivotally attached to its respective arm at a distance from the centrifuge axle that is greater than the distance of the workpiece from the axle. Accordingly, the accretion substrate rotates at speed identical to that of the workpiece and can therefore be fixed directly and permanently in the path of the ejected material. Furthermore, the laser can work continuously rather than intermittently, thus speeding the production process. The arms can be removably attached so that the apparatus can function in the manner of the fifth preferred embodiment, shown in FIGS. 12 and 13. In operation, released material is generally projected at an angle of approximately 60.3 degrees from a radial line from the axis of the centrifuge to the point on the workpiece from which the material is released. by positioning the accretion substrate at the intersection of that angle and the radial distance from the axis, the ejected material can be directed to a specific location on the substrate. This configuration may be best suited for embodiments in which the laser beam is carried on the centrifuge.

FIG. 15 shows that two or more of the centrifuges 800, 810 can be disposed in a side-by-side relationship and rotated in opposing directions so as to eject material 820, 830 onto opposing sides of an accretion substrate 850 positioned in the ejected material paths between the centrifuges. This ganging of centrifuge systems creates multiple material streams that can be manipulated during the manufacturing process. As material accumulates on the substrate, and as the mass of the developing product increases, the substrate can be rotated to present the side or edge of the substrate so that accretion material can be directed to the sides of the developing product. Alternatively and/or additionally, the positions of one or more of the centrifuges can be adjusted relative to one another to provide material streams directed from different angles and to produce all the accretion surfaces of the product. Obviously, the use of ganged centrifuges will increase manufacture speed.

FIGS. 16, 16a-16f illustrate the way in which the inventive system can be employed to effect a sectioning process. The main objective of such a process is to remove sections of a workpiece without ablating or melting all of the section material. The process entails using an energy source to make a series of cuts around the perimeter of a section so that the section is no longer attached to the workpiece. For example, to remove a square cube of volume from a workpiece 900 (FIG. 16), first the perimeter 910 of the square exposed to the surface is cut to the cube depth (FIG. 16a). The second cut 920 (FIG. 16b) is from a top side edge 930 to the opposite side bottom edge 940. This will remove half of the volume in a triangular wedge. The third cut 950 (FIG. 16c) is along the line projecting from the opposite top edge 960 to the bottom edge 970 of the first side. This wedge removed is again half of the remaining volume. The fourth cut 980 and fifth cut 990 (FIG. 16d) are each from a top edge to the bottom center 1000 of the cube. The shape removed will be a diamond with flat ends and is again about half of the remaining volume. This process continues in a succession of cut that each removes about half of the remaining volume (FIGS. 16e-16f) until the rate of removal through sectioning is less than the melting or ablation rate for the material. This process greatly increases the material removal rate up to about 300 times the typical laser material removal rate (and up to two to seven times greater than traditional high speed milling).

The Workpiece: The workpiece must be a solid material, as a liquid or gas would not have sufficient surface tension or internal bond strength to hold itself together under the rotational force imparted by the centrifuge. Solid materials suitable for machining include metal, plastic, mineral, glass, composite, organic, and frozen gases and liquids. The shape of the workpiece can be pre-formed into a shape appropriate for the machining process and attachment to the fixture, which includes block forms, cylindrical forms, polyhedral shapes, plates and rings. The workpiece can also be used as a blank for multiple small parts. One method is to form a single small part and then remove it as the workpiece rotates (a landing area would be required) or to form the parts and separate them after processing. Ring-shaped workpieces can be placed over a centrifuge hub. Sections of the ring could then be formed as individual items or the ring can be worked as a single part. The workpiece can be made of a flexible material and be carried in a fixture which provides the structural shape necessary for being worked under angular forces.

The Fixture: The purpose of the fixture is to attach and secure the workpiece to the centrifuge. It can comprise a single attachment device, such as a bolt or screw attachment. A single surface can be used, such as a plate, cylinder, ring or bowl with attachment devices such as screws or bolts or adhesives. Multiple surfaces can also be used such as clamps or vises attached to frames. Magnetic platens can also be used for rapid attachment. Fixtures can be manually attached to the workpiece or there can be automatic clamping or attachment systems.

A single fixture (FIGS. 1 and 2) or multiple fixtures (FIGS. 3-13) can be on the centrifuge. The use of one or more paired fixtures (FIGS. 3-13) provides a method of processing two items concurrently. With the two fixtures on opposite sides of the centrifuge axis, the mass and force can remain balanced on the centrifuge.

The fixtures can be fixed in relationship to the centrifuge. In such a case, a fixed portion of the workpiece is presented in an outwardly facing relationship to the outer arc of the fixture's radial motion.

Alternatively, the fixtures can be mounted turntables with adjustable axes. These include a single axis of rotation or multiple axes of rotation. For example, if the turntable axis is approximately parallel to the centrifuge axis, the workpiece can be rotated on the turntable to expose all sides of the workpiece. Placing the turntable on an adjustable arm that pivots perpendicular to the radius of the centrifuge allows the top as well as the sides of the workpiece to be shaped. This allows for complex three-dimensional forms to be manufactured. The fixtures can also be attached to the centrifuge so that they are adjustable in translation in a single direction or in multiple directions.

Fixtures can be attached directly to the centrifuge or can be attached to a cassette. The fixtures can be attached to the centrifuge as a permanent part or the fixtures can be removable. A fixture cassette system allows the workpiece to be installed in a cassette outside of the machine. The cassette system also allows the exchange of filled cassettes from the centrifuge. Workpieces can be removed or inserted into the cassette while the centrifuge is processing another cassette group. In a cassette system there may be single cassettes or cassettes assembled into trays. If multiple cassettes are contained within a tray, the system may include either removable cassettes or an exchange system for trays of cassettes. The trays of cassettes can be handled in a number of configurations similar to the configurations for handling compact disks, including planar carrousels, vertical stacks, and vertical carrousels.

The Centrifuge: The centrifuge includes the workpiece, the fixtures, fixture cassettes and a rotating carriage. There are many possible configurations for the centrifuge. It may have a single level or multiple levels. Additionally, it may be oriented relative to the floor plane in a number of ways. Horizontal centrifuges with the centrifuge axis perpendicular to the plane are a traditional configuration for centrifuges used in other applications. Vertical centrifuges with the axis parallel to the plane may have some advantages in a gravitational field because the weight of the centrifuge is supported by the same bearings that provide radial alignment, and both sides of the centrifuge support structure are made accessible. Other orientations may be employed, and the orientation may also be made to be adjustable or pivotal so the centrifuge may be worked on in one orientation and then placed into another orientation for product processing.

Centrifuge Configuration Options: The size of the centrifuge is tailored to the intended uses. For very small articles of manufacture, small centrifuges can be used. As the workpiece size increases, the requirements for controlling and constraining the rotation also increase and may impose a size limitation on the system, though this limitation is likely quite large.

The rotating carriage of the centrifuge holds the fixtures or fixture cassettes. It rotates about an axis. The carriage may contain the axis within it, or it may rotate with an axle, or the carriage may be a separate structure that rotates about a fixed axle. The rotating carriage is secured relative to a base structure with radial bearings and axial bearings. The radial bearings smoothly transfer the forces about the axis of rotation. Axial bearings smoothly transfer the force along the axis of rotation. These bearings can be of any type, including air bearings.

Another alternative is to employ multiple carriages on a circular track. In such a case, the axis does not require a discrete structure.

The centrifuge can be an unbalanced system with the circular path restrained by bearings or, more typically, the centrifuge can be balanced. The process of balancing the centrifuge can be manual or automatic. Cassettes can be pre-balanced prior to installation on the centrifuge.

Centrifuge rotation is induced with a motor, which may be electric (either direct drive or via a transmission system), or it may be an air motor or hydraulic motor.

The Release System: The release system provides means for adding energy to the workpiece surface to weaken the bonds of the surface material. It can include a single source and have a single path from the source to a discrete workpiece, as shown in FIG. 2, or it can include multiple sources directed at multiple workpieces, as shown in FIGS. 3-5. The direction from which the energy source is pointed at the workpiece can be from any angle suited to the kind of shaping, cutting, finishing, or other machining operation to be accomplished. To allow the released material particles to clear the workpiece, the tangential path should be unobstructed by the workpiece.

The release system may have a single source and multiple paths to the workpiece. For example, a laser beam can be reflected from a number of different mirrors and be directed at multiple points around the circumference of the centrifuge. In addition to having a single source and either a single path or multiple paths, the system may also have multiple sources and multiple paths. Different types of sources can be combined into a single machine. Alternatively, multiple centrifuges can use the same source or sources.

As an example, in a dual centrifuge system, each centrifuge is either active or being loaded or unloaded. In this example, when one centrifuge is being slowed down, the deceleration energy is used to start up a second centrifuge. Further, if a single energy source such as a laser were used, the laser may work nearly constantly with very little downtime.

The beam path for energy beams depends on the source of energy used. In the case of a $CO_2$ laser, the wavelength of the beam is absorbed by glass, so the beam path is in air or a vacuum and directed and controlled with mirrors. In the case of a YAG laser, the beam passes through glass, so the beam path can be directed through fiber optic cables and controlled with mirrors. Other energy sources such as electron beams, microwaves, and radio waves each have their own methods of control.

The energy source can be controlled in intensity and duration. This includes variation of the intensity of the beam impinging on the workpiece during a short pulse. If required or desired, the beam intensity may start at one level to "soften" the area and then change to another level to release more material from the workpiece. The energy beam can be controlled with lenses and mirrors, either fixed, variable, rotating, angular or translating. For example, if a laser beam is projected onto a flat mirror on a rotation axis parallel to the centrifuge and rotating at the same frequency and opposite direction as the centrifuge, it is possible to direct the laser beam to a specific point on a workpiece surface across a number of degrees of angle as the workpiece passes. Alternatively, if the mirror is fixed, a beam directed toward the workpiece surface, for any period of time, will produce a line as the surface rotates across the beam, instead of a sharp point.

The focus of the energy beam can also be controlled from a diffuse zone of energy to an extremely small point. The beam can have a energy pattern determined by the laser source cavity such as a thin pointed cone in a Gaussian Beam or broader beams such as a Dimodal or Quadramodal beam. Usual techniques can be used to prevent the energy beam from reflecting back into the source such as directing the beam at a slight angle so that the reflection does not have a return path.

In addition to energy beams, spray jets can also be used. Pressurized gas or liquid is passed through valves into a tubular delivery system and out through nozzles. This can have a singular nozzle or multiple nozzles around the exterior of the centrifuge. The nozzles can be fixed in their orientation to the workpiece or be adjustable. The direction of the angle of the nozzles is not restricted. The nozzles and pressure system can be combined into single unit as an "ink jet."

In addition to focused energy sources, an unfocused energy source may also be employed to condition the workpiece to release material when centrifuged. For example, masking processes may be conducted in an oven in which one or more workpieces are placed. As the oven reaches a sufficiently high temperature to melt the workpiece material, exposed surface material will release and break away.

The Containment System: There are two levels to the containment system, the machine enclosure and the work area container.

The Machine Enclosure: Complete enclosure of the complete system would typically be required. This includes providing safety systems to assure that if a laser is used, the enclosure will not let out any damaging laser light.

Many types of material outgas and burn, particularly plastics, thus releasing various types of toxins that must be neutralized and contained, and any fluids used in the process must also be contained, neutralized, and filtered. Otherwise, the operator and others in the area could breathe fine dust particles which the inventive process generates. These dust particles may be on the order of one micron in size. The system must include means to prevent these particles from causing injury.

Further, the machine and operator need to be separated with a barrier to prevent the operator from coming into contact with the moving parts. Another objective of the enclosure is to shield the exterior environment from damage should the centrifuge or workpieces break in a catastrophic incident.

The machine enclosure also provides a level of protection for the machine itself from incidental damage.

The Work Area Containment: The work area is a zone surrounding the workpiece rotating on the centrifuge. The releasing energy passes through this zone to get to the workpiece and it is where the particles are released and contained. The purpose of this containment system is to limit the path of particles and protect the operator and the environment. It also allows the environment of the workpiece to be controlled. Further, it protects the release system so that it is not contaminated or damaged by the particles. Access to the work area by the energy source is through openings or windows in the containment system. The work area container can be shaped so that the portions though which the focused energy are passed are closer to the workpiece and the areas for the particle paths are further away.

A portion of this container can also have a laser light-proof window and a synchronized strobe light could illuminate the workpiece as it passes.

The Control System: The control of the system is preferably software operating on a dedicated computer system. The main systems controlled by the computer include the centrifuge, the releasing agent (i.e., energy source), the accretion system, environmental control, and emergency shutdown. In all of these systems the optimum control will include sensor feedback.

The centrifuge control includes rotation rate and timing, fixture orientation, workpiece control such as heating, cooling or electrically charging, automatic balancing system, clamping systems, and the bearing system.

The energy source/releasing agent system control includes the intensity and duration of the source. The pathway control for a beam includes controlling mirrors, lenses and the environment for the beam. The alignment system control is included. For a jet, the pathway control includes valves and orifice changes as well as pressure controls.

The accretion control system includes substrate orientation, particle path control and accretion environmental control.

Environmental control includes the internal work area gases, temperature, electrical, magnetic environment as well as the processing of the gases, fluids and solids that are byproducts. This also includes the compensation systems for normalizing the internal environment from external sources such as heat or cold or dust.

The emergency shutdown system includes sensors to monitor critical components and to control the action of the system so that catastrophic accidents are prevented.

The foregoing disclosure is sufficient to enable those with skill in the relevant art to practice the invention without undue experimentation. The disclosure further provides the best mode of practicing the invention now contemplated by the inventor.

While the particular apparatus for tangential manufacturing and the tangential manufacturing method herein shown and disclosed in detail is fully capable of attaining the objects and providing the advantages stated herein, it is to be understood that it is merely illustrative of the presently preferred embodiments of the invention and that no limitations are intended to the detail of construction or design herein shown other than as defined in the appended claims. Accordingly, the proper scope of the present invention should be determined only by the broadest interpretation of the appended claims so as to encompass all such modifications as well as all relationships equivalent to those illustrated in the drawings and described in the specification.

What is claimed is:

1. A tangential manufacturing system, comprising:
   at least one motorized centrifuge having a base, and an axle with an axis of rotation;
   at least one workpiece fixture disposed on said base of each of said centrifuges for attaching at least one workpiece to its respective centrifuge;
   a material release system having an energy source for adding sufficient energy to the surface of a workpiece held in said fixture to release material from the workpiece;
   a containment structure surrounding said centrifuge for controlling the manufacturing environment immediately surrounding said centrifuge and preventing unwanted materials and gases from interfering with the manufacturing process;
   a control system for at least controlling said material release system; and
   at least two optical guide arms radially extending from said axle, each of said guide arms having proximal and distal ends and include reflecting means to direct beams from said energy source to the workpiece;
   wherein said reflecting means comprises upper and lower distal mirrors disposed at said distal ends, and further wherein said axle is hollow and includes an opening at its upper end and one proximal mirror axially disposed within said axle for each of said guide arms, whereby when said beam is directed through the opening in said axle, it is split into divergent beams by said proximal mirrors and directed radially through each of said optical guide arms to said upper distal mirrors, at which point they are directed downwardly to said lower distal mirrors, which reflect the beams to the workpieces.

2. A tangential manufacturing system, comprising:
   at least one motorized centrifuge having a base, and an axle with an axis of rotation;
   at least one workpiece fixture disposed on said base of each of said centrifuges for attaching at least one workpiece to its respective centrifuge;
   a material release system having an energy source for adding sufficient energy to the surface of a workpiece held in said fixture to release material from the workpiece;
   a containment structure surrounding said centrifuge for controlling the manufacturing environment immediately surrounding said centrifuge and preventing unwanted materials and gases from interfering with the manufacturing process;

a control system for at least controlling said material release system; and at least two optical guide arms radially extending from said axle, each of said guide arms having proximal and distal ends and include reflecting means to direct beams from said energy source to the workpiece wherein said beam is directed by said reflecting means inwardly toward said axis of rotation.

3. A tangential manufacturing system, comprising:

at least one motorized centrifuge having a base, and an axle with an axis of rotation;

at least one workpiece fixture disposed on said base of each of said centrifuges for attaching at least one workpiece to its respective centrifuge;

a material release system having an energy source for adding sufficient energy to the surface of a workpiece held in said fixture to release material from the workpiece;

a containment structure surrounding said centrifuge for controlling the manufacturing environment immediately surrounding said centrifuge and preventing unwanted materials and gases from interfering with the manufacturing process;

a control system for at least controlling said material release system; and at least two optical guide arms radially extending from said axle, each of said guide arms having proximal and distal ends and include reflecting means to direct beams from said energy source to the workpiece;

wherein said energy source includes at least two laser sources, one each disposed atop one of said optical guide arms, such each of said laser directs a beam toward said distal end of said guide arm, and said reflecting means reflect the beam such that it is finally directed inwardly toward said axis of rotation.

4. The system of claim 3, wherein said workpiece holding means has at least one axis of rotation which allows the workpiece to pivot relative to the beam of energy.

5. The system of claim 3, wherein said workpiece holding means are disposed on a selectively removable cassette which can be axially disposed over said axle.

6. The system of claim 3, further including at least one arm extending from said base for supporting an accretion substrate, such that the accretion substrate rotates at speed identical to that of the workpiece and can therefore be fixed directly and permanently in the path of material ejected from the workpiece.

7. The system of claim 3, wherein said system includes ganged centrifuges having material release means directing energy to the workpieces such that material may be ejected from the workpieces to create multiple material paths that simultaneously apply material to opposing sides of an accretion substrate.

8. The system of claim 3, further including an accretion system having an accretion substrate and means for holding said accretion substrate.

9. The system of claim 8, wherein said control system controls and integrates the actions of said material release system and said material accretion system.

* * * * *